Dec. 8, 1925.
G. N. BRUNKER ET AL
1,565,054
VEHICLE SEAT
Filed Oct. 29, 1923    2 Sheets-Sheet 1
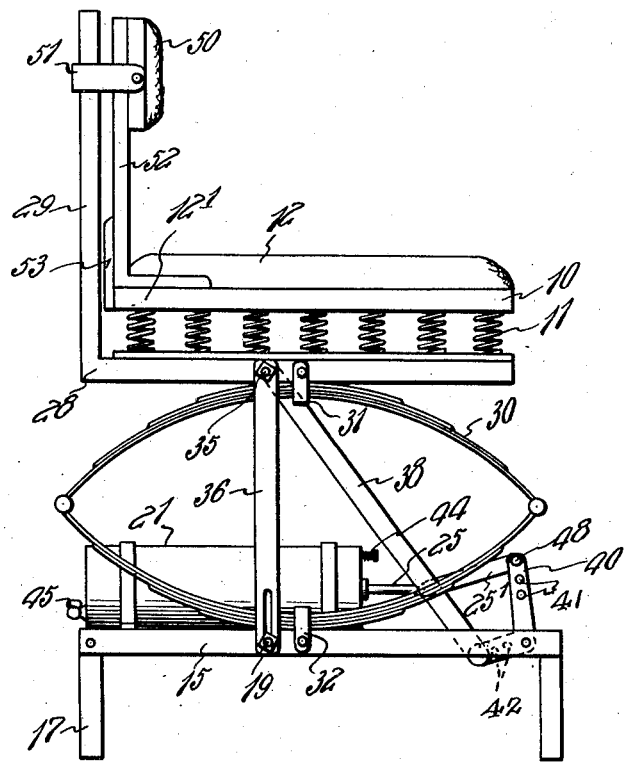
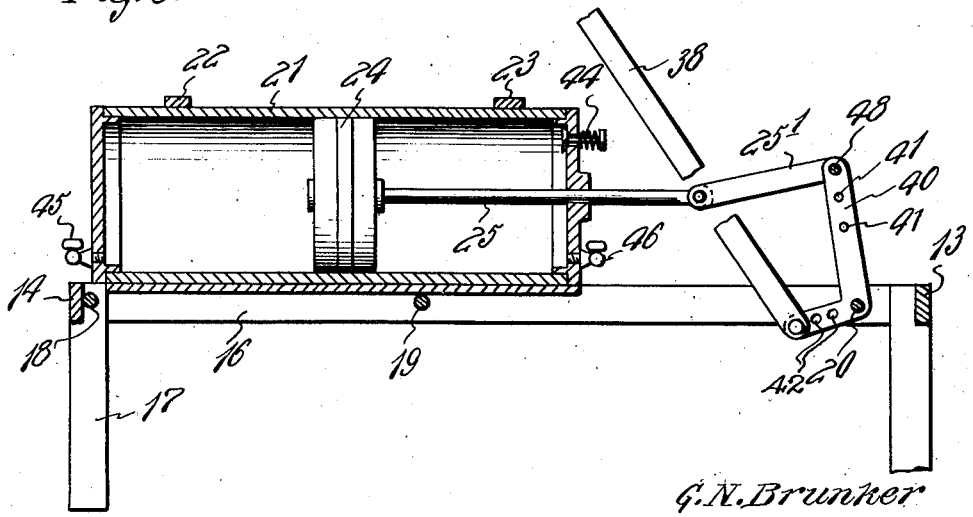
G. N. Brunker
H. A. Woodland
INVENTOR
BY Victor J. Evans
ATTORNEY
WITNESS:

Dec. 8, 1925.  1,565,054
G. N. BRUNKER ET AL
VEHICLE SEAT
Filed Oct. 29, 1923  2 Sheets-Sheet 2

G. N. Brunker
H. A. Woodland
INVENTOR

BY Victor J. Evans
ATTORNEY

WITNESS:

Patented Dec. 8, 1925.

1,565,054

UNITED STATES PATENT OFFICE.

GEORGE N. BRUNKER AND HENRY A. WOODLAND, OF SALT LAKE CITY, UTAH.

VEHICLE SEAT.

Application filed October 29, 1923. Serial No. 671,567.

*To all whom it may concern:*

Be it known that we, GEORGE N. BRUNKER and HENRY A. WOODLAND, citizens of the United States, both residing at Salt Lake City, in the county of Salt Lake and State of Utah, have invented new and useful Improvements in Vehicle Seats, of which the following is a specification.

The object of this invention is to provide a seat for use on vehicles and on agricultural machines, the mounting means of the seat including resilient elements, and air controlled means governing the operation of the resilient devices.

A further object is to provide the required degree of resiliency, in one direction, and avoid the sudden movement incident to the return of the leaf springs to normal position.

A further object is to provide spring controlled means governing the movement of both the seat and the back thereof, and an air cylinder cooperating with the resilient elements.

A still further object is to provide a device including a cushioned seat per se, a supporting element, leaf springs between said element and seat, an air cylinder and plunger, and connections permitting the leaf spring to act freely upon the downward movement of the seat, but serving to retard the return movement, or movement to normal position, thereby avoiding shocks incident to the uneven surface of the roadway.

With the foregoing and other objects in view, the invention consists in the novel construction and arrangement of elements described, illustrated and claimed, it being understood that modifications may be made within the scope of the claim without departing from the spirit of the invention.

In the drawings forming part of this application:

Figure 1 is a view of the construction in end elevation.

Figure 3 is chiefly in longitudinal section, showing the air cylinder and showing certain operative elements connected with the plunger, of said cylinder, in elevation.

Figure 2:
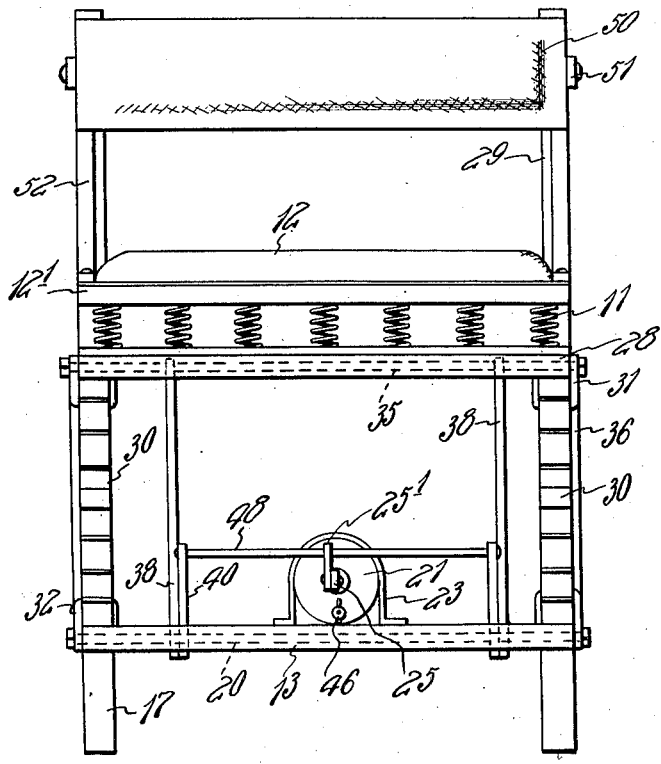
Figure 2 is a front elevation.
Figure 5:
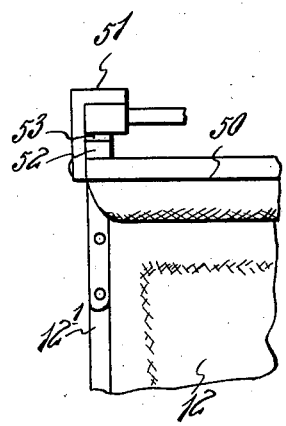
Figure 5 is a fragmentary view, showing an upper corner portion of the structure of Figure 1, in top plan.
Figure 4:
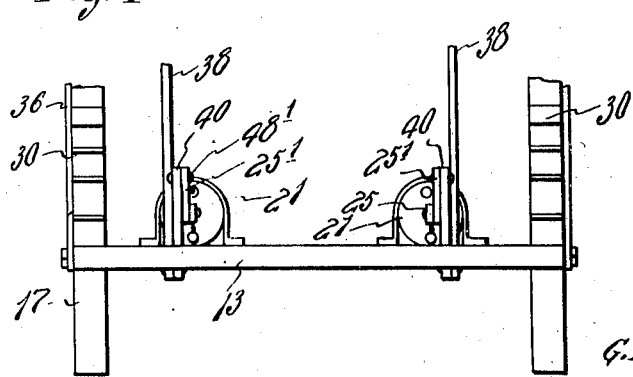
Figure 4 shows a slight modification, the view being a fragmentary view in front elevation, and showing the use of two air cylinders.

The seat per se includes the frame 10, coiled springs 11, and cushion 12. This seat is mounted on a supporting frame comprising front and rear members 13, 14, end members 15, 16, and legs 17.

Extending through the end members are rods or bars 18, 19, 20, and an air cylinder 21 mounted above bars 18, 19, is secured by straps 22, 23. The plunger for this cylinder is designated 24, and the rod therefor is shown at 25.

The frame 10 of the seat is mounted in angle brackets including horizontal members 28 and vertical members 29, and a leaf spring 30, at each end of the seat is secured at 31 to member 28, and is secured at 32 to the supporting frame, any well known connecting and mounting devices being employed for this purpose.

A bar 35 passes through both elements 28 of the angle brackets, and through the upper end of a vertical bar 36, at each end of the seat, and bar 37 passes through the lower ends of both bars 36, the latter being slidable with reference to the supporting frame and preventing endwise movement of the seat.

The connections between the seat per se and the air cylinder are important, and include a bar 38, at each end, connected with bar 35 and having indirect connection with the piston rod 25. Rocker arms 40 are mounted on bar 20, as shown, and two series of apertures 41, 42, permit of adjustable connection with bar 38 and with link 25' pivoted to the piston rod.

A check valve 44 admits air to cylinder 21 when the plunger moves toward the left, and valves 45, 46 are located as shown.

Upon the downward movement of the seat including frame 10, and the downward movement of bars 38, the upper ends of rocker arms 40 will move inwardly and cause link 25' to impart thrust to the piston rod and plunger during which movement air will be admitted by check valve 44, and air will pass from the opposite end of the cylinder through valve 45. During this time the seat is under resilient control only, and the leaf springs act as they would in any case. The return movement of the seat and springs (causing an unpleasant jolt), is retarded and cushioned because the air is allowed to escape slowly through valve 46, which may be adjusted as desired. Valve 45 may also be adjusted if it is desired to retard the downward movement of the seat and spring.

One air cylinder has thus far been referred to, and if but one is employed, the rocker arms 40 may be connected by a rod 48, and one link 25' provided between the rod and piston rod 25. If two smaller cylinders are used, two links 25¹ would be connected with the rocker arm by pivots 48'.

A back 50 is slidable with reference to vertical elements 29 of the angle brackets and is guided by straps 51 passing around these elements. The back is mounted on the base 12' of the cushion, by means of elements 52, 53 of the form shown. Since the back moves with the cushion, there is no unpleasant frictional contact.

What we claim is:

In a device of the class described, a supporting element, a leaf spring mounted thereon, a seat mounted on the spring, a cylinder mounted on the supporting element, a rocker arm mounted on this element, a piston for the cylinder and a piston rod, said rocker arm having two series of apertures, and the arm being pivoted at a point between the two series of apertures, a link connected with one of the apertured portions and with the piston rod, and a bar connected with the seat and with the rocker arm, at a point within the limits of the remaining series of apertures.

In testimony whereof we affix our signatures.

GEORGE N. BRUNKER.
HENRY A. WOODLAND.